US008122005B1

(12) United States Patent
Juang et al.

(10) Patent No.: US 8,122,005 B1
(45) Date of Patent: Feb. 21, 2012

(54) TRAINING SET CONSTRUCTION FOR TAXONOMIC CLASSIFICATION

(75) Inventors: Philo Juang, Los Angeles, CA (US); Christopher Testa, Venice, CA (US); Nicolaus Mote, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 299 days.

(21) Appl. No.: 12/604,025

(22) Filed: Oct. 22, 2009

(51) Int. Cl.
*G06F 17/30* (2006.01)
(52) U.S. Cl. ... 707/710; 707/706; 707/758; 707/E17.09; 706/12; 706/46
(58) Field of Classification Search .................. None
See application file for complete search history.

(56) References Cited

U.S. PATENT DOCUMENTS

| | | | |
|---|---|---|---|
| 6,360,227 B1 * | 3/2002 | Aggarwal et al. .......... | 1/1 |
| 7,409,404 B2 * | 8/2008 | Gates .................... | 1/1 |
| 2001/0037324 A1 * | 11/2001 | Agrawal et al. ........... | 707/1 |
| 2009/0055368 A1 * | 2/2009 | Rewari et al. ............ | 707/4 |
| 2009/0300046 A1 * | 12/2009 | Abouyounes .............. | 707/102 |
| 2011/0029463 A1 * | 2/2011 | Forman et al. ........... | 706/12 |
| 2011/0035345 A1 * | 2/2011 | Duan et al. ............. | 706/12 |
| 2011/0040711 A1 * | 2/2011 | Perronnin et al. ........ | 706/12 |

OTHER PUBLICATIONS

Beitzel, S. M., Jensen, E.C., Frieder, O., Grossman, D., Lewis, D.D., Chowdhury, A., and Kolcz, A., (2005). Automatic Web Query Classification Using Labeled and Unlabeled Training Data. Proceedings of the 28th Annual International ACM SIGIR Conference on Research and Development in Information Retrieval, (pp. 581-582). Salvador, Brazil.

Broder, A. Z., Fontoura, M., Gabrilovich, E., Joshi, A., Josifovski, V., and Zhang, T. (2007). Robust Classification of Rare Queries Using Web Knowledge. Proceedings of the 30th Annual International ACM SIGIR Conference on Research and Development in Information Retrieval, (pp. 231-238). Amsterdam, The Netherlands.

Shen, D., Pan, R., Sun, J.T., Pan, J.J., Wu, K., Yin, J., and Yang, Q. (Dec. 2005). Q2c@ust:Our Winning Solution to Query Classification in KDDCUP 2005. ACM SIGKDD Explorations Newsletter, pp. 100-110.

Shen, D. Sun, J.T., Yang, Q., and Chen, Z. (2006). Building Bridges for Web Query Classification. Proceedings of the 29th Annual International ACM SIGIR Conference on Research and Development in Information Retrieval, (pp. 131-138). Seattle, Washington.

Shen, D., Pan, R., Sun, J. T., Pan, J. J., and Wu, K. Y. (Jul. 2006). Query Enrichment for Web-query Classification. ACM Trans. Inf. Syst. 24 , pp. 320-352.

\* cited by examiner

*Primary Examiner* — Hung Le
(74) *Attorney, Agent, or Firm* — Brake Hughes Bellermann LLP

(57) ABSTRACT

A training set generator may be configured to input a taxonomy including a hierarchy of categories and a plurality of top-level sites, and to output a training set of categorized data. The training set generator may include a crawler configured to crawl each of the top-level sites to determine at least one lower-level site associated therewith and to store the top-level sites and associated lower-level sites as crawl data. The training set generator also may include an extractor configured to determine, for each of the top-level sites, a corresponding site-specific extraction template associating at least one portion of the corresponding top-level site with at least one category of the hierarchy of categories, and further configured to apply each site-specific extraction template to corresponding crawl data to thereby associate the crawl data with the categories of the hierarchical categories and obtain categorized data of the training set.

18 Claims, 5 Drawing Sheets

TRAINING SET CONSTRUCTION FOR TAXONOMIC CLASSIFICATION

TECHNICAL FIELD

This description relates to taxonomic classification.

BACKGROUND

It is often a difficult task for computing systems to receive a document or other content and to determine a meaning or other content of the document. For example, while it may be straightforward to determine individual words within the document, it is often difficult to determine (with a given degree of certainty) a context of a given word, or relationships between words which impart meaning to the document as a whole. For example, it may be straightforward for a computing system to determine that a document contains the word "bank." However, it may be more problematic for the computing system to determine whether the word "bank" in the document refers to, e.g., a financial institution, a bank of a river, or a turning of an airplane; all of which may be referred to using the term bank (or variations thereof).

Nonetheless, it is known that such information about the meaning or content of a document may potentially be very useful with respect to use of the document. For example, advertisers may wish to know about the content of a document, so as to more accurately and more meaningfully place their advertisements within content-related documents. For example, a financial institution may wish to place an advertisement within a document using the word bank in the context of finance, but not within one of the other contexts just referenced above. Consequently, computing systems and applications have been developed for determining a content, context, or meaning of documents, e.g., for the purpose of providing advertisements within such documents, or otherwise benefitting from knowledge about the content or meaning thereof.

One such technique may be referred to as taxonomic classification. In taxonomic classification, a taxonomy related to a particular topic or context is developed which includes a plurality of hierarchical categories, e.g., in a tree structure. For example, a taxonomy related to automobiles may include a first level categorizing automobiles as used or new. A level lower in the hierarchy of categories may distinguish each of the above categories as foreign or domestic cars, and lower levels may continue to branch into further defining characteristics of cars, including, e.g., a make, model, price or other feature of cars that may be associated with the taxonomy.

Then, in taxonomic classification, a generally large set of known documents may be considered, parsed, or otherwise analyzed to apply the hierarchical categories (and/or other features of the taxonomy) as labels to individual documents (or portions thereof) from a set of documents. For example, a number of human readers may be employed to read each of the individual documents within the set of known documents, and to apply categories or other features of the taxonomy as labels to individual elements of the document. For example, a human user may read a document and identify the word "civic" and may, if appropriate, associate the word "civic" with a model of the automobile Honda Civic, where, as just referenced, such an automobile model may be a category within the hierarchy of categories of the associated automobile taxonomy. Consequently, the so-labeled document may be categorized or labeled with respect to the automobile taxonomy, and not with reference to, for example, a civic duty of a citizen, or other meaning.

When all of the documents of the known set of documents have been appropriately labeled as just described, then the resulting set of labeled documents may be referred to or known as a "golden set," or a "training set." Known techniques exist for analyzing such a training set to determine a classifier model. Such a classifier model, in general, represents rules or other criteria which are derived from the labeled documents. For example, such a classifier model may include a set of rules which, for each labeled word or term, considers other factors, such as a proximity of the labeled word to other words within the document, and assigns a probability of the word in the particular context as having one or more meanings within that context. Then, a taxonomic classifier may be used to receive or otherwise determine a new document which is not a part of the set of labeled or categorized documents, and to implement the classifier model in conjunction with the original taxonomy in order to classify the newly-received documents with respect to the taxonomy. Once that classification has occurred, the taxonomy classifier may be further configured to attach, insert or otherwise provide supplemental content which is thought to be related to the newly-received and now-classified document.

Although such techniques have proven very useful in classifying newly-received documents which would otherwise be difficult to classify with respect to the taxonomy, the use of, and need for, human users to read the original set of documents and assign labels to portions thereof, as just described, represents a significant bottleneck in the classification process, and adds a large amount of delay and expense to the process as a whole. For example, it may take users days or longer to read each of the documents within the original/known set of documents, and each of the users may be compensated for his or her efforts. Further, whenever some element of the taxonomy or the set of documents changes, then the process must be repeated in whole or in part, which, again, may add significant delay and expense to the classification process as a whole. In particular, such changes may need to occur rapidly in order to keep up with changing content of the documents (e.g., when a new and very popular product or concept appears within the documents). Consequently, it may be problematic to implement taxonomic classification in an effective manner, and in a manner which is fast, inexpensive, and easily-updatable.

SUMMARY

According to one general aspect, a computer system may include instructions recorded on a computer-readable medium. The computer system may include training set generator may be configured to input a taxonomy including a hierarchy of categories and a plurality of top-level sites, and to output a training set of categorized data. The training set generator may include a crawler configured to crawl each of the top-level sites to determine at least one lower-level site associated therewith and to store the top-level sites and associated lower-level sites as crawl data. The training set generator also may include an extractor configured to determine, for each of the top-level sites, a corresponding site-specific extraction template associating at least one portion of the corresponding top-level site with at least one category of the hierarchy of categories, and further configured to apply each site-specific extraction template to corresponding crawl data to thereby associate the crawl data with the categories of the hierarchical categories and obtain categorized data of the training set.

According to another general aspect, a computer-implemented method may include determining a taxonomy including a hierarchy of categories, determining a plurality of top-level sites related to the taxonomy, determining, for each of the top-level sites, a corresponding site-specific extraction template associating at least one portion of the corresponding top-level site with at least one category of the hierarchy of categories, crawling each of the top-level sites to determine at least one lower-level site associated therewith, storing the top-level sites and associated lower-level sites as crawl data, and applying each site-specific extraction template to corresponding crawl data to thereby associate the crawl data with the categories of the hierarchical categories and obtain categorized data.

According to another general aspect, a computer program product may be tangibly embodied on a computer-readable medium and may include executable code that, when executed, is configured to cause a data processing apparatus to determine a taxonomy including a hierarchy of categories, determine a plurality of top-level sites related to the taxonomy, determine, for each of the top-level sites, a corresponding site-specific extraction template associating at least one portion of the corresponding top-level site with at least one category of the hierarchy of categories, crawl each of the top-level sites to determine at least one lower-level site associated therewith, store the top-level sites and associated lower-level sites as crawl data, and apply each site-specific extraction template to corresponding crawl data to thereby associate the crawl data with the categories of the hierarchical categories and obtain categorized data.

The details of one or more implementations are set forth in the accompanying drawings and the description below. Other features will be apparent from the description and drawings, and from the claims.

DETAILED DESCRIPTION

Figure 1:
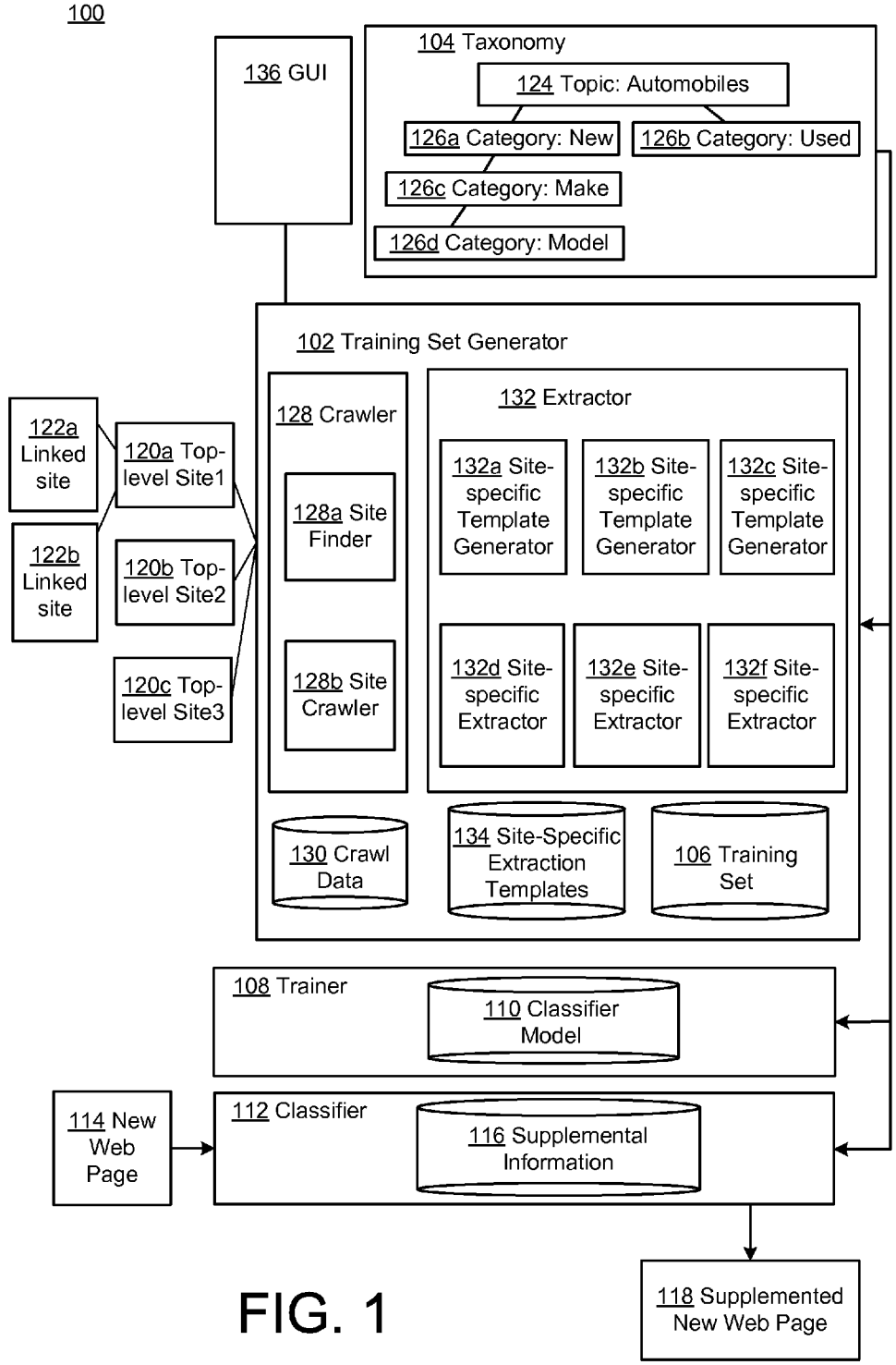
FIG. 1 is a block diagram of a system for automatically generating a training set for use in taxonomic classification.

FIG. 1 is a block diagram of a system 100 for automatically generating a training set for use in taxonomic classification. In FIG. 1, a training set generator 102 is implemented in conjunction with a taxonomy 104 to automatically generate a training set 106 of labeled or otherwise-categorized documents. That is, as referenced above, such a training set as the training set 106 may be known as, or referred to as, a golden set, and may be used by the trainer 108 in conjunction with the taxonomy 104 to generate or maintain a classifier model 110. Then, when a classifier 112 receives a new document 114, such as, e.g., a webpage or other content, the classifier 112 may use the classifier model 110 to classify the new document 114, so that appropriate supplemental information 116 (e.g., an advertisement) that is related to the new document 114 may be determined.

Consequently, the classifier 112 may then output a supplemented version of the new webpage (or other document) 118, which then includes the new webpage or other document 114 (or portions thereof) along with the selected/related supplemental information from the supplemental information 116. The training set generator 102 thus provides a fast, inexpensive and easily-updatable technique for providing the training set 106, with little or no human intervention or involvement. In this way, the system 100 as a whole may be executed and used in a more effective and optimized manner.

In operation, as described in more detail below, the training set generator 102 may be configured to determine a plurality of websites or other documents referred to herein in as top-level sites, and illustrated in the example of FIG. 1 as including top-level sites 120A, 120B, 120C. Further, the training set generator 102 may be configured to analyze each such top-level site and determine corresponding sites and documents which are linked thereto, illustrated conceptually in FIG. 1 as linked site 122A and linked site 122B, each shown as being linked to the top-level site 120A.

In FIG. 1, the taxonomy 104 is illustrated as including a topic 124 of "automobiles," as well as categories 126A-126D, which are illustrated as hierarchical categories within a tree structure of the taxonomy 104. Specifically, a category 126A of "new" is illustrated, along with a category 126B of "used" at a same level of the taxonomy tree. A category 126C of "make" of the automobile is illustrated at the next level, while a final category 126D of "model" of the automobile is illustrated at the lowest level of the taxonomy. Of course, it may be appreciated that the taxonomy 104 is illustrated merely as a simplified conceptual example of a taxonomy for purposes of discussion and explanation within the present description, and that, in practice, such a taxonomy may include a large number of levels of the hierarchy, each of which may include an appropriate and potentially large number of branches.

In operation, then, a crawler 128 of the training set generator 102 may be used to examine the top-level sites 120A, 120B, 120C, as well as some or all of the sites linked thereto, represented as referenced above by linked sites 122a and 122b. Examples of such crawl operations, by themselves, are known in the art and are not described here in further detail, except as needed or helpful to understand other aspects of the described implementations. In general, though, such crawl operations may involve, e.g., beginning with a website such as the top-level site 120A, and then selecting (in series or in parallel) some or all of the links (e.g., hyperlinks) therein. Crawling proceeds with collecting information/data about each crawled site (e.g., a uniform resource locator (URL) or other information), and then with further following of links contained within the linked sites (e.g., to further-linked sites of the linked sites 122a, 122b, not explicitly illustrated in FIG. 1). The crawling process may continue until a linked site is reached which contains no more links, or until some number (level) of linked sites have been crawled, or until some other criteria is met for ceasing the crawling operation(s).

The information obtained by the crawler 128 during the above-described process may then be stored within crawl data 130. Thus, it may be appreciated that the crawl data 130 represents all of the obtained information, such as, for example, all of the various webpages, sites, or other documents obtained by the crawler 128, as well as information about where and how each such document was obtained. For example, in the system of FIG. 1, it may be assumed that the various sites 120A-120C and 122A, 122B are sites on the public internet. In this case, the crawl data 130 may include each of the relevant documents, along with a uniform research locator (URL) identifying the location of the corresponding document on the public internet. Of course, this is merely an example, and the sites 120A-120C, 122A, 122B may in fact be located and crawled in other contexts. For example, such sites may be available on a private network, or on a corporate intranet, or may otherwise be available for crawling by the crawler 128.

Consequently, it may be appreciated that the terminology used herein should be considered to be representative and exemplary, and not exclusive of other terminology which is similar or related in meaning. For example, in this context, the term "site" may be understood to refer to a website within the worldwide web (www) of the public internet. However, it is known that terminology such as site, website, page, webpage and other similar terminology is generally used more or less interchangeably within the art. Therefore, although such terminology may be used consistently herein for ease of explanation and for the sake of consistency and clarity, it may be appreciated that such terminology should be understood to have the meaning that would be described thereto by one of ordinary skill in the art. For example, the term, "top-level site" is used herein to indicate that the training set generator 102 begins with such a site in executing the crawling functions of the crawler 128, and otherwise in generating the training set 106. Nevertheless, it would be appreciated that each such top-level site may in fact be the child site of another site (e.g., or may be linked from such a parent site), and therefore may not literally be a top-level site with respect to the provider of the corresponding website as a whole.

Further in FIG. 1, an extractor 132 is illustrated which is configured to analyze the crawl data 130 and to apply site-specific extraction templates 134 thereto in order to obtain the training set 106. That is, the extractor 132 may be configured to take and analyze each webpage or other document contained within the crawl data 130, and any information associated therewith, and to parse the individual document according to a corresponding extraction template. In this way, the extractor 132 may be configured, e.g., to extract individual terms within the document being analyzed so as to apply one or more categories 126A-126D of the taxonomy 104 to the extracted term(s) being considered.

For example, as in the examples above, the extractor 132 may examine a document from the crawl data 130 and extract a word "civic," and may apply a corresponding site-specific extraction template to the document in question so as to associate the category 126D "model" to the extracted term. In this regard, it may be appreciated that associated categories (above or below the applied category within the taxonomy 104) may be explicitly or implicitly applied to the extracted term as well. For example, the application of the category 126D in the manner just described may implicitly be considered to label the extracted term with category 126C ("make"). Thus, as already described, the training set 106 may be generated as a set of labeled documents and/or labeled terms thereof, in accordance with the taxonomy 104 and for further use by the trainer 108 and the classifier 112 as described herein and/or otherwise known to one of skill in the art.

In more detail, the crawler 128 and the extractor 132 may be considered to have portions/modules related to a design or parameterization of the training set generator 102, as well as portions/modules associated with an actual execution or runtime of the training set generator 102. For example, the crawler 128, during a design or parameterization of the training set generator 102, may implement a site finder 128A which may assist in determining the top-level sites 120A-120C, as such. In general, the site finder 128A may operate in association with a graphical user interface (GUI) 136 which may allow a user of the system 100 to specify, identify, or otherwise determine the top-level sites 120A-120C as such.

For example, such a user may know or be aware that the top-level site(s) 120A-120C represents highly representative and well-structured examples of websites related to the taxonomy 104. For example, in the FIG. 1, the taxonomy 104 is related to automobiles. Consequently, a user may implement the GUI 136 to input to site finder 128A top-level sites 120A-120C which are known to be representative (e.g., widely or popularly accessed) and highly-structured in their relation to the taxonomy 104.

In the illustrated automobile example, a number of websites exist which are widely used to provide data about automobiles for use by potential purchasers of automobiles. That is, potential purchasers of automobiles may desire to analyze and compare various makes and models in order to make a personally useful decision with respect to the cost, features, or other characteristics of the car that the potential purchaser may wish to buy. In this way, such websites provide potential purchasers with the ability to directly compare the various makes and models of cars to one another, and to obtain general information regarding an expectation with respect to a price, feature, or other characteristic of the automobiles being considered. In these and other examples, of course, such sites also may be associated with (or provide) an actual purchase of a selected automobile, either using the website in question directly or through an associated automobile dealer who is local to the potential purchaser.

Thus, as a result of the nature and use of top-level sites 120A-120C, and of their general nature as being related to, in this example, automobiles, the user of the GUI 136 may select the top-level sites as being useful and representative for crawling by the crawler 128. Moreover, it will be appreciated that the top-level sites 120A-120C provide an inherent structure which may be conceptually analogous to the structure of the taxonomy 104 itself. For example, potential purchasers of automobiles may wish to begin at a high level of analysis by visiting the top-level site 120A which may provide an overview or starting point for such a potential purchaser to consider various automobiles for potential purchase. Then, the potential purchaser may follow various links of the top-level site 120A which allow the user to explore, to a desired level of detail, more types of automobiles that he or she may wish to purchase.

In general then, by their nature, the top-level sites 120A-120C may be sites that are well-known or best-known to a potential purchaser or other user interested in automobiles, and thus may be relatively apparent to a user of the system 100. Consequently, in some example implementations, the site finder 128A may operate simply by providing appropriate selection fields within the GUI 136, into which the user of the system 100 may enter the URL or other identifying information of the top-level sites 120A-120C.

In other examples, the site finder 128A may be more complex, and may assist the user to a greater degree in identifying the top-level sites 120A-120C. For example, the site finder 128A may include or be associated with a search engine of some type which may allow the user to enter desired search terms related to the taxonomy (such as, e.g., automobiles or related terms) and may consequently return the top-level sites 120A-120C as part of the search results to the user of the system 100 using the GUI 136. In this way, the user may be presented with a limited number of sites to inspect so as to select the top-level sites 120A-120C as such for usage in the system 100.

In still more detailed examples, the site finder 128A may be configured to analyze the search results, and to provide information indicating a degree of suitability of use of the top-level sites 120A-120C with respect to the training set generator 102. For example, as referenced above, the top-level sites 120A-120C ideally include, or relate to, a highly-structured representation of the related content, so that it is relatively straightforward for the extractor 132 to extract the most relative terms from the crawl data 130 and to apply categories of the taxonomy 104 as labels thereto, as described in more detail below. Thus, the site finder 128 may have access to defining characteristics of websites which facilitate such operations of the training set generator as described herein and, as just described, may present such information to the user of the system 100, via the GUI 136, so as to assist the user in selection of the top-level sites 120A-120C from among the provided search results.

Then, during an actual execution or runtime of the training set generator 102, an executable site crawler 128B may proceed with crawling the top-level 120A-120C and any/all linked sites 122A, 122B. The site crawler 128B may be provided with information which assists the site crawler 128B in determining exactly whether, how, and to what extent to execute the crawling operation(s). For example, as referenced above, the site crawler 128B may be configured to crawl every link of every linked subpage of the top-level sites 120A-120C, until no more such links are available. In other examples, the site crawler 128B may be configured to cease the crawling operations after a certain number of levels of links that have been followed, or when some other criteria has been met, such as, for example, that the linked documents being examined are no longer sufficiently relevant to the top-level site in question.

In this regard, the site crawler 128B may be configured on a per-site basis. For example, a first site crawler may be specific to the site of the top-level site 120A and may be configured to crawl the top-level site 120A for a certain number of levels. A second instance of the site-crawler 128B may be configured to crawl the top-level sites 120B to a different (e.g., a larger or smaller) number of linked sites. Other example embodiments may be implemented, as would be apparent to one skilled in the art.

Similarly, the extractor 132, as referenced above, may be considered to have both a design/parameterization phase, as well as components related to an actual execution or runtime of the extraction process. For example, during a design or parameterization of the extractor 132, site-specific template generator(s) 132A-132C may be used to generate corresponding extraction templates for inclusion within the site specific extraction templates 134.

For example, in FIG. 1, three top-level sites 120A-120C are illustrated, so that a corresponding number of three site-specific template generators 132A-132C are illustrated as well. During a design or parameterization phase, then, the site specific generator 132A may be associated with the top-level site 120A, so that a user of the system 100 may use the GUI 136 to specify characteristics of the top-level site 120A for a corresponding generation of an extraction template therefore.

A process of using the site specific generator 132A with respect to a corresponding top-level site 120A to generate a corresponding site specific extraction template may be referred to as tuning the extractor 132 for application thereof against the top-level site 120A and associated linked sites 122A, 122B. For example, the top-level site 120A may have certain characteristics or techniques associated with its use of terminology associated with the taxonomy 104. Specific examples of the characteristics or construction of the top-level site 120A in this regard are provided below, e.g., with respect to FIG. 3. In general, however, it may be appreciated that the top-level site 120A may use particular techniques to represent a manner in which the top-level site 120A includes or otherwise provides information related to the taxonomy 104. For example, the top-level site 120A may provide information about new cars in one portion of the site, and may provide information about used cars in another portion of the site. Similarly, the top-level site 120A may use a particular hypertext markup language (HTML) tag in association with one category of the taxonomy 104 (e.g., the category 126D "model"). In yet another example, the top-level site 120A may use a particular type of display tool in providing information, such as, e.g., a popup window, in order to provide information about a particular category of the taxonomy 104. Thus, it may be appreciated that, in contrast, the top-level site 120B and the top-level site 120C may use the same or different techniques or formats when presenting what is otherwise essentially the same (type of) information, at least with respect to the taxonomy 104. That is, all of the top-level sites 120A-120C may include essentially the same information about a given make and model of an automobile, yet may present such information in different ways to a viewer of the corresponding website. Thus, the site specific template generator 132A provides the user of the system 100 with the ability to designate a manner in which each top-level site 120A-120C (in this case the top level site 120A) provides such information. As shown, a site specific generator 132B may be similarly used for the top-level site 120B, while a site specific generator 132C may be used in conjunction with the top-level site 120C.

Once the necessary number of site specific extraction templates 134 have been constructed and designed, and once the site crawler 128B has compiled the crawl data 130, execution of the corresponding site specific extractions 132D-13F may begin. That is, for example, the site specific extraction 132D may obtain crawl data from the crawl data 130 which relates to the top-level site 120A, and may simultaneously obtain the extraction template corresponding to the top-level site 120A and generated by the site specific template 132A from the extraction templates 134. The site specific extractor 132D may then apply the obtained extraction template to the obtained crawl data to thereby extract relevant words or terms from the obtained crawl data and label such words or terms with one or more corresponding categories of the taxonomy 104. Then, the resulting labeled extracted data may be included within the training set 106. This process may be repeated by the site specific extractor 132C for the top-level site 120B, and by the site specific extractor 132F or the top-level site 120C. In this way, the training set 106 may be compiled for all of the sites and associated documents in question.

In the example of FIG. 1, as described, the GUI 136 may be used by a user of the system 100 to, e.g., parameterize or otherwise design aspects of the training set generator, e.g., of the crawler 128 or the extractor 132. The GUI 136 may be specifically designed for use with the training set generator 102, or may be generally associated with the taxonomy 104, the trainer 108, and/or the classifier 112. That is, for example, the GUI 136 may represent a known GUI which is modified for use with the system 100. That is, the GUI 136 may be used to configure or implement virtually any or all of the components 102, 104, 108, 112, or subcomponents thereof, or related components, as would be apparent. In other examples, the GUI 136 may be replaced in whole or in part with other known techniques for configuring or implementing the components 102, 104, 108, 112, or subcomponents thereof, such as, e.g., text-based interfaces.

Thus, as described, the system 100 provides the user thereof with an ability to automatically generate the training set 106, without any need for human users to individually label documents for use in constructing the training set 106 and ultimately the classifier model 110. Thus, the training set 106 may be generated in a fast and inexpensive manner. Further, when changes occur to the taxonomy 104 or to the top-level sites 120A-120C or associated sites, the training set generator 102 may provide a corresponding update to the training set 106 in a fast and inexpensive manner.

For example, continuing the automobile example as described herein, it may occur that the manufacturer releases a new model or make of car. Then, in practice, one or more of the top-level sites 120A-120C will be expected to add such new car model in conjunction with the already-existing structure of the relevant site in presenting car models. Since, as described, such structure in presenting categories of the taxonomy 104 has already been captured by corresponding site specific extraction template 134 for the site in question, the site specific extractor (e.g., 132D-132F) will generally automatically detect presence of the new model as such, and will automatically include the new model within the associated category of the taxonomy 104 when extracting model information from the top-level site in question for inclusion within the training set 106. In this regard, it may be appreciated that such updates may occur without direct involvement of the user 100. For example, training set generator 102 may be configured to execute periodically at some predetermined interval so as to provide relatively constant or frequent updates to the training set 106 which would not otherwise be possible or practical in the conventional technique which require human use or involvement in generating the training set 106.

Although for sake of simplicity and clarity, only certain non-limiting examples of the system 100 have been provided, it will be appreciated that many other implementations may exist. For example, the system 100 may supplemented by human involvement in the extraction or labeling process. In other examples, as referenced in more detail below, the training set generator 102 may be used to enhance, supplement, or otherwise modify or generate the taxonomy 104 itself. For example, during operation of the crawler 128 in crawling the top-level sites 120A, one of the linked sites 122A may include links to a review of particular model of car, so that an additional category (not specifically illustrated in FIG. 1) related to a review or other characterization of the particular model may be added to the taxonomy 104. Then, in future iterations of the training set generator 102, the crawler 128 and extractor 132 may include such a newly added category in the process of generating the training set 106. Other example implementations of the system 100 are described herein, or would be apparent.

Figure 2:
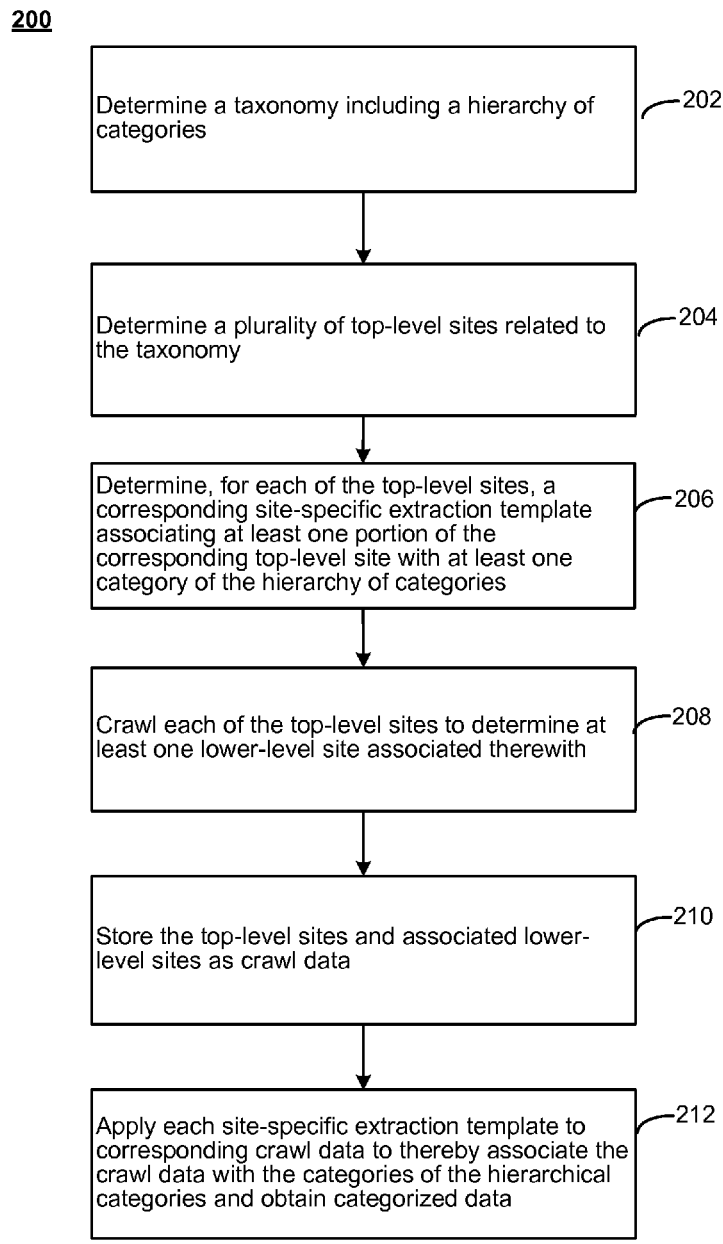
FIG. 2 is a flowchart illustrating example operations of the system of FIG. 1.

FIG. 2 is a flowchart 200 illustrating operations of the system 100 of FIG. 1. Although the example of FIG. 2 illustrates operations 202-212 of FIG. 1 in a sequential order, it will be appreciated that any of the operations of FIG. 2 may in fact be operated in a parallel or overlapping fashion, or may be executed in a different order than that illustrated, except as noted otherwise herein. Other variation examples would be apparent.

In FIG. 2, a taxonomy including a hierarchy of categories may be determined (202). For example, the taxonomy 104, as described above, may include reference to topic 124, such that, automobiles as well as a plurality of hierarchy categories 126A-126D may be determined, as illustrated in FIG. 1 and discussed above. The training set generator 102 may therefore initially determine the taxonomy 104 for use in determining and generating the training set 106. For example, the crawler 128 may determine the taxonomy for use in determining the top-level sites 120A-120C and/or for determining how to conduct crawling thereof. As another example, the extractor 132 may access the taxonomy 104 for use by the site specific template generators 132A-132C in generating the corresponding site extraction templates 134 for specific ones of the top-level sites 120A-120C.

The plurality in top-level sites related to the taxonomy may be determined (204). For example, the site finder 128A of FIG. 1, as referenced above, may simply receive identification of the top-level sites 120A-120C from user of the system 100 via the GUI 136. In other examples, the site finder 128A may conduct a search based on input of key terms from the user, and may return search results including various websites for a selection of the top-level site 120A-120C therefrom.

For each of the top-level sites, a corresponding site specific extraction template may be determined which associates at least one portion of the corresponding top-level site with at least one category of the hierarchy of categories of the taxonomy (206). For example, the site specific template generator 132A may determine for the top-level site 120A a corresponding extraction template that is specific to the top-level site 120A, and, thereby, to linked lower level sites 122A, 122B. For example, such a site specific extraction template may associate a portion of the top-level site 120A with identification of automobile models and thereby associate that portion with the category 126D of the taxonomy 104. As referenced above, the portion of the top-level site 120A which is to be associated with the category 126D "car model", may be specified using virtually any structure or aspect of website, specific examples of which are provided below with respect to FIG. 3.

Each of the top-level sites may be crawled to determine at least one lower level site associated therewith (208). For example, the site crawler 128B may crawl the top-level site 120A to detect any and/or all links thereon, including, for example, the link to the linked site 122A and link to the linked site 122B. The site crawler 128B may crawl each of the links on the top-level site through the various lower level sites until all (or a sufficient number) of links have been crawled.

The top-level sites, in association with lower level sites, may be stored as crawl data (210). For example, the site crawler 128B may store the top-level sites 120A-120C and any linked sites, or lower level sites, 122A, 122B within crawl data 130. For example, the crawl data 130 may include all or a specified portion(s) or subset(s) of each such site, as well as a location (e.g., URL) of each site.

Each site specific extraction template may be applied to corresponding crawl data to thereby associate the crawl data with the categories of the hierarchal categories of the taxonomy and thereby obtain categorized data (212). For example, such a site specific extraction template may be selected by the site specific extractor 132 from the site specific extraction template 134 as corresponding to the top-level site 120A. Then, the site specific extractor 132D may be configured to identify the top-level site 120A from the crawl data 130 and to apply the corresponding site specific extraction template thereto. For example, the site specific extractor 132D, as referenced above, may determine from the corresponding site specific extraction template that the category 126D "model" of the taxonomy 104 is associated in the top-level site 120A with a particular HTML tag and/or portion (e.g., location) of the top-level site 120A. Then, the site specific extractor 132D may pull or extract all links or other data from the specified portion of the top-level site 120A and label each such extracted piece of information with the category 126D "model".

These operations may continue, e.g., for example, with respect to the site specific extractor 132C extracting similar information from the corresponding top-level site 120B. It will be appreciated, for example, that the corresponding site specific extraction template for the top-level site 120B may specify a different portion, location, HTML tag, or other identifiers associated with the top-level site 120B as being associated with the category 126D "model". Nonetheless, because the site specific extractor 132C uses the corresponding site specific extraction template, it will be possible to identify the appropriate information from within the top-level site 120B which should be labeled using the category 126D "model". Consequently, all data within the training set 106 may be included as categorized data which is labeled consistently with the categories 126A-126D of the taxonomy 104. For example, as referenced above, the term "civic" may be stored in association with the category 126D "model" and in association with identification of each of the top-level sites 120A-120C in which the categorized term appeared.

Figure 3:
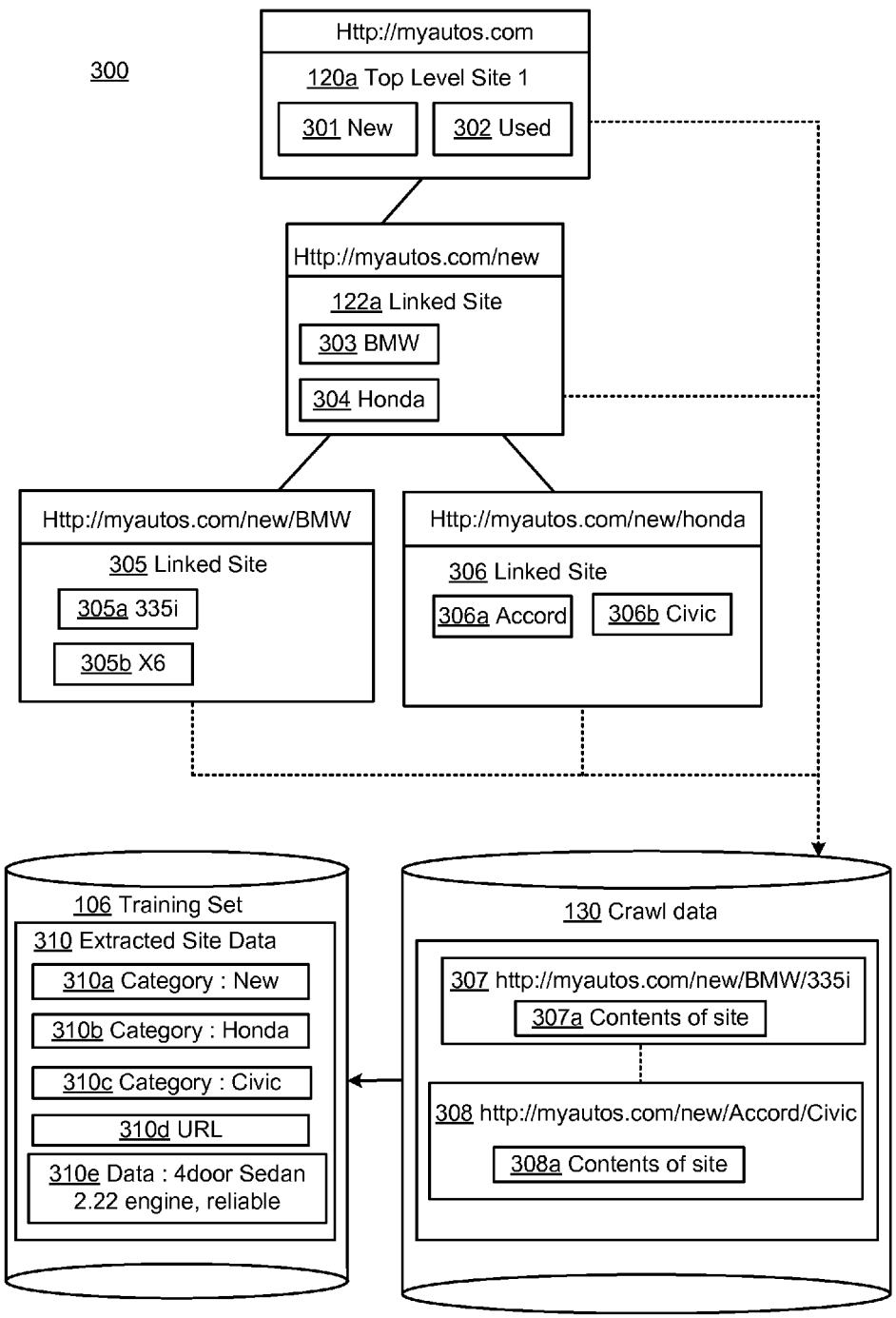
FIG. 3 is a block diagram illustrating screen shots and their relation to stored data within the system of FIG. 1.

FIG. 3 is a block diagram 300 illustrating screen shots and their relation to stored data within the system 100 of FIG. 1. In the example of FIG. 3, the top-level site 120A is illustrated as a hypothetical website having URL http://myautos.com, and thus continues the example of FIG. 1 in which the taxonomy 104 relates to the topic 124 of automobiles. In the example of FIG. 3, the top-level site 120A is illustrated including a first portion 301 related to new automobiles and thus a second portion 302 related to used automobiles. It will be appreciated that the portions 301 and 302 of the top-level site 120A may be classified as such within or by the top-level site 120A using any of a variety of known techniques for constructing webpages. For example, as referenced above, the portion 301 may be designated or recognized by using HTML tags within the source code of the top-level site 120A and/or by specifying the physical location of the portion 301 on the page or top-level site 120A, or by specifying a presentation tool of the top-level site 120A, such as, e.g., a popup window. It will be appreciated that the top-level site 120A, as referenced above, may be entered directly by the user of the system 100 into the GUI 136, or may be a result of a search conducted by or in association with, the website finder 128A.

As shown further in FIG. 3, selection of the portion 301 may link to a linked or lower level site 122A illustrated in FIG. 3 as having the URL http://myautos.com/new, in which the example portions 303 and 304 are illustrated as related to new cars having to make BMW and Honda, respectively. As further shown in FIG. 3, the portion 303 may therefore lead to a further link or lower level site 305 having a URL http://myautos.com/new/bmw, in which portions 305A and 305B relate to car models 335I and X-6 for the make BMW. Similarly, the portion 304 of the linked site 122A may lead or link to a lower level site 306 having URL http://myautos.com/new/honda in which portions 306A and 306B relate to Honda models "Accord" and "Civic", respectively.

It will be appreciated that the examples of FIG. 3 provides a simplified example for the purposes of illustration, and that, in reality, many variations may exist. For example, it may occur that the top-level site 120A includes a number of links related to various levels of detail of each new or used automobile. For example, the portion 301 related to new automobiles may provide links to Honda and associated models Accord and Civic directly within the portion 301, i.e., so that a user may link directly to the linked site 306 from the top-level site 120A. In other words, the top-level site 120A need not be associated specifically or exclusively with the hierarchy of linked sites which correspond directly to the hierarchy of categories 126A-126D of the taxonomy 104. However, it will be appreciated from the present description that it is a purpose of the corresponding site specific extraction template to effectively map a structure of top-level site 120A and linked pages or sites corresponding thereto to the structure of the taxonomy 104, so that categories of the taxonomy may be applied as labels to extracted portions of the top-level site 120A and its various linked sites or lower level sites.

Further in FIG. 3, crawl data 130 is illustrated as storing the various data obtained from the top-level 120A and associated linked or lower level sites 122A, 305, and 306, as obtained by the site crawler 128B. In the specific example of FIG. 3, the crawl data 130 includes entry 307 which specifies the portion 305A of the linked site 305 as including the URL http://myautos.com/new/bmw/335I as having been obtained by the site crawler 128B and stored within the crawl data 130. As shown, the thus-stored page 307 may include content of the identified URL or site, illustrated as content 307A. Similarly, the crawl data 130 is illustrated as including an entry 308 corresponding to the portion 306B of the linked or lower level site 306 corresponding to the model "Civic", and therefore having URL http://myautos.com/new/honda/civic, as shown. Again, the entry 308 includes a sub entry 308A searched by contents of the identified site. Thus, as shown, the crawl data 130 stores all of the various crawled websites and (relevant) content thereof.

Then, as may be appreciated from the system 100 of FIG. 1, of the extractor 132 may select a site specific extraction template corresponding to the top-level site 120A (e.g., as may be generated by the site specific extractor 132A), and apply the so-identified extraction template to the crawl data 130 as corresponding to the top-level site 120A. In this way, as described above and as illustrated in FIG. 3, the training set 106 may be determined by extracting the most important or most relevant elements of the crawl data 130 and associating such data and/or elements with categories of the taxonomy 104.

For example, in FIG. 3, extracted site data 310 is illustrated as including one or more categories and other data stored in conjunction with the extracted data for the top-level site 120A as obtained from the crawl data 130. For example, the entries 310A to 310E relate to the entry 308 of crawl data 130. Specifically, the entry 308 of crawl data 130 as identified as being associated in the entry 310A with the category new 126A, and entry 310B is being associated with the category Honda for the category 126C, and in entry 310C with the category Civic for the category 126D of "model". Further, the entry 310D may specify URL as shown in the entry 308 of the crawl data 130. Still further, the entry 310E may include data obtained from the corresponding crawled site, which, in the example of FIG. 3, may include data or information related to the Honda Civic as obtained from the linked site 306B of FIG. 3, including, e.g., identification as a four door sedan, having a 3.2 liter engine, and being associated in manufacturer or consumer reviews as being family-friendly, reliable, or otherwise.

Figure 4:
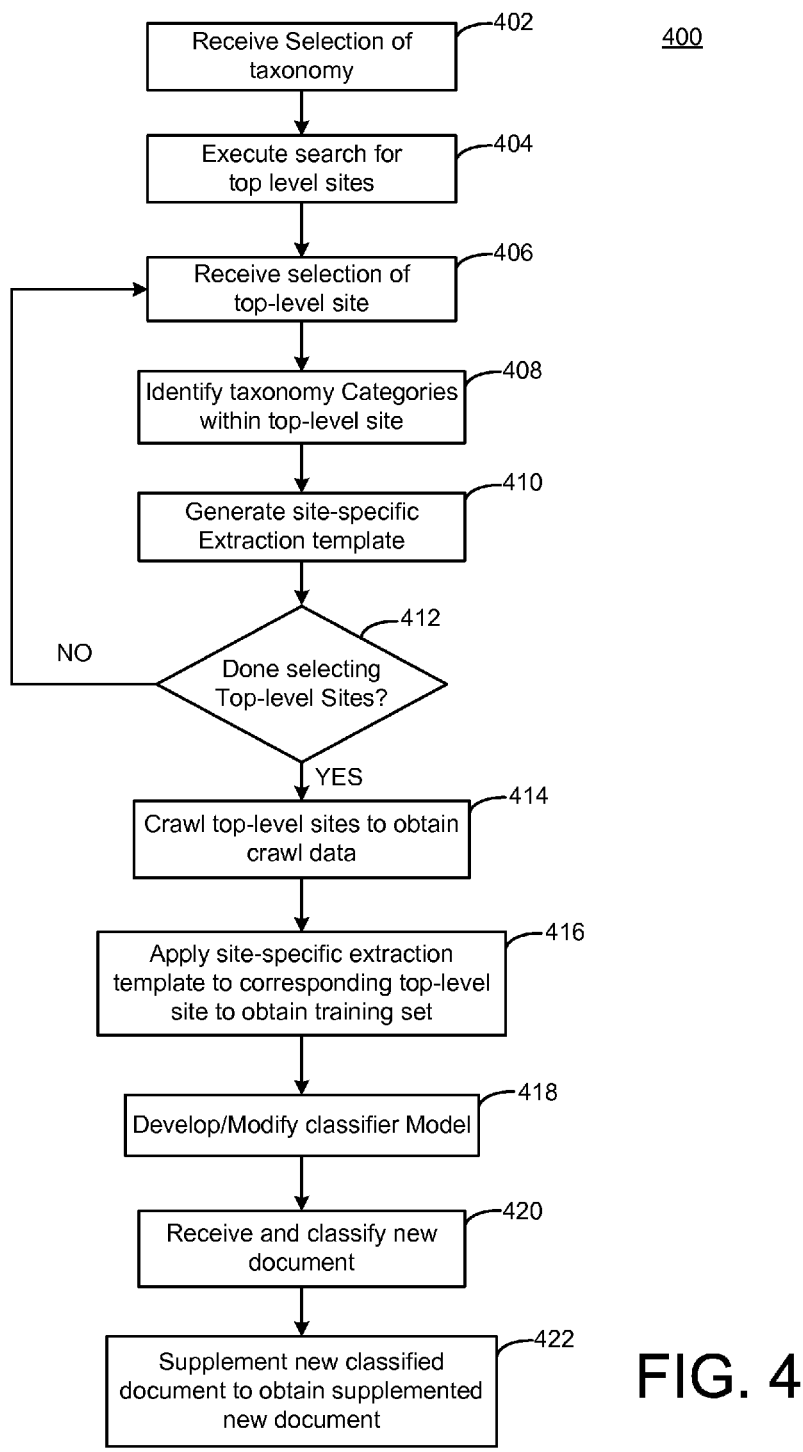
FIG. 4 is a flowchart illustrating more detailed and/or specific more specific examples of the operation of system of FIG. 1.

FIG. 4 is a flowchart 400 illustrating more detailed and/or specific more specific examples of the operation of system 100 of FIG. 1. In the example of FIG. 4, a selection of taxonomy may be received (402). For example, the training set generator 102 may use GUI 136 to allow user to select the taxonomy 104 from a plurality of taxonomies for which a training set may be generated.

A search may then be executed for top-level sites (404). For example, the site finder 128A may implement a search engine which allows the user to enter the topic and one or more categories of the selected taxonomy, and may then thereafter return a certain number of websites deemed to be most relevant thereto. The user may easily select from among the provided websites so as to determine the top-level sites 120A-

120C. In further implementations, the site finder 128A may designate the search results as being more or less relevant or useful in the operation of the training set generator 102, e.g., by analyzing the structure of each of the obtained potential top-level sites. It would be appreciated that in the example of FIG. 1, only three top-level sites 120A-120C are illustrated, but in practice, a smaller or larger number of top-level sites may be selected, as may be appropriate or desirable for a specific implementation of the system 100.

A selection of top-level sites may be received (406). For example, in the example just given, the user may select one of the search results by clicking on a particular search result within the GUI 136. Then, the site specific template generator 132A may obtain information for use in generating corresponding site specific extraction templates by, e.g., allowing the user to select or otherwise identify taxonomy categories within the selected top-level site (408). For example, the site specific template generator 132A may present or consider the top-level site 120A and/or source code thereof, using the GUI 136, and may allow the user to click on or otherwise select a portion thereof for association thereof with a particular category. For example, the site specific template generator 132A may present the category 126A "new", and then receive a selection or other identification of a portion of the top-level site 120A which corresponds to that category 126A. By so doing, the site specific generator 132A may gain specific information to generate the corresponding site specific extraction template (410).

If the user is not done selecting top-level sites (412), then a second or next selection of a top-level site may be received (406), and a generation of a corresponding site specific extraction template may proceed (408, 410). If, however, the user is finished selecting top-level sites (412), then the top-level sites may be crawled to obtain the crawl data 130 (414). For example, the website crawler 128B may crawl each of the top-level sites 120A-120B and associated lower level sites, (for example, the linked sites 122A, 122B), as illustrated and discussed above with respect to FIGS. 1 and 3. Of course, it may be appreciated that the user may be provided with the option of selecting/adding additional top-level sites in the future, as well, as needed or desired.

Site specific extraction templates may then be applied to corresponding top-level sites to obtain the training set 106 (416). For example, each of the various site specific extractors 132D-132F may be applied to corresponding top-level sites 120A-120C to obtain the training set 106, which as shown in FIG. 3, may include individual words, phrases, or elements of the crawl data and association with appropriate categories of the taxonomy and other related data.

Then, as shown in FIG. 1, the training set may be used to develop a new classifier model or to modify an existing classifier model 110 (418). For example, the trainer 108 may use existing machine learning techniques to generate the classifier model 110. As referenced above, and as well known in the art, the classifier model 110 generally includes a set of rules or other criteria derived from the training set 106 which establish, e.g., a likelihood, probability, or estimate of a relationship between individual words or terms of a document such as a website to the categories of the taxonomy 104.

Consequently, when a new webpage 114 is received at classifier 112, the newly received webpage 114 may be classified according to classifier model 110 (420). For example, the classifier 108 may receive the new webpage 114 and parse the content thereof to determine presence of the word "civic" therein, and based on other content of the newly received webpage 114 in relation thereto, in conjunction with the classifier model 110, may determine that the new webpage 114 is in fact related to the taxonomy 104, and specifically, to the category 126D "model".

Then, the classifier 112 may select appropriate supplemental information 116 for addition to the new webpage 114 to receive the supplemented webpage 118 (422). For example, as referenced above, the supplemental information may include advertisement related to the Honda Civic, or to other car models. Consequently, an advertiser producing such an advertisement may have knowledge or confirmation that the supplemented new webpage 118 will represent an appropriate placement of the advertisement for or to a user who is likely to be interested in the advertisement, based on the fact that the user was already interested in viewing the new webpage 114 determined to be related thereto in terms of topics, content, or meaning.

Operations of the flowchart 400 of FIG. 4 may periodically be repeated in whole or in part, as would be apparent or desired. In particular, as referenced above, it may occur that a content or a structure of the websites illustrated in FIG. 3 may change over time. For example, it may occur that the automobile make "Honda" illustrated in portion 304 of FIG. 3 may become associated with a new model which is produced by that manufacturer. Then, such a new model may be understood to be included in the linked site 306 as a new link or portion 306C (not specifically illustrated in FIG. 3). Consequently, the site crawler 128B and corresponding site specific extractor 132D will be operable to detect and label such a new entry or portion as being associated with the category 126D within the training set 106, without (or with minimal) human involvement. Similarly, an entirely new manufacturer may be included within the portion 301 "new" of the top-level site 120A, and may thus appear within the linked site 122A as a new site or portion in conjunction with portion 303 and 304 (again, not specifically illustrated in FIG. 3). In this way, again, such a new manufacturer may be included and appropriately labeled within the training set 106, with minimal or no human involvement, and merely by operation of the site specific extractor in applying the site specific extraction template to the top-level site 120A and associated sites 122A, 305, 306.

It will be further appreciated that even if a general structure or format of the sites 120A, 122, 305, 306 changes over time, such changes may reflected merely by reconstructing or retuning the corresponding site specific extraction template. For example, the corresponding site specific extraction template may simply be updated to reflect the fact that various portions of the sites in question have been rearranged, renamed, or relabeled, so then the training set generator 102 may be executed to obtain an updated training set 106 using the updated extraction template(s).

In still further examples, it may be appreciated that the training set generator 102 may be operable to enhance the structure of the taxonomy 104 itself For example, in executing the crawling of the top-level site 120A, the site crawler 128B may identify a site (a linked site or lower level site) which extends beyond the lowest level of category of the taxonomy 104. For example, there may be a linked or lower level site of the portion 306B of FIG. 3 which provides further detail about the model "Civic". As referenced above, such information may include further specifications of the referenced car model, reviews thereof, or other information. In this case, such information may be obtained for inclusion as a subcategory of category 126D model and ultimately included as an enhancement or supplement to taxonomy 104. For example, such information may be presented to the user via the GUI 136 with an option for inclusion thereof within the taxonomy 104, e.g., by illustrating the taxonomy 104 and allowing the user to select a placement of the new information as a category therein. Many other examples and variations of the systems and operations of FIGS. 1 to 4 would be apparent to one skilled in the art.

Figure 5:
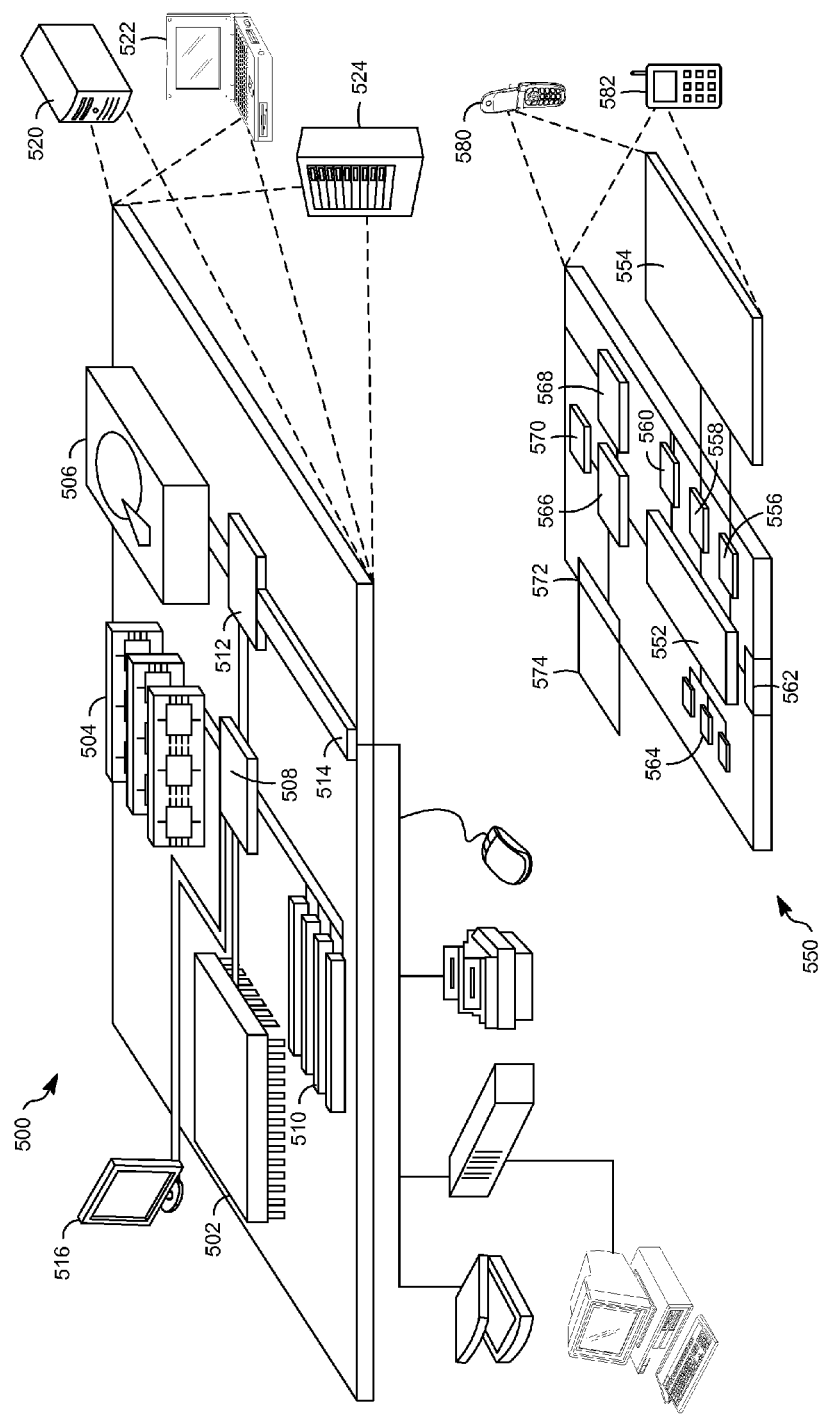
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system including instructions stored on a computer-readable medium, the computer system comprising:
   - a training set generator configured to input a taxonomy including a hierarchy of categories and a plurality of top-level sites, and to output a training set of categorized data, the training set generator including:
   - a crawler configured to crawl each of the top-level sites to determine at least one lower-level site associated therewith and to store the top-level sites and associated lower-level sites as crawl data;
   - an extractor configured to determine, for each of the top-level sites, a corresponding site-specific extraction template associating at least one portion of the corresponding top-level site with at least one category of the hierarchy of categories, and further configured to apply each site-specific extraction template to corresponding crawl data to thereby associate the crawl data with the categories of the hierarchical categories and obtain categorized data of the training set,
   - wherein the extractor includes at least one site-specific extractor that is configured to apply the site-specific extraction template to the crawl data associated with the corresponding top-level site, including extracting instances of the categories from the crawl data and labeling the extracted instances using the categories within the training set, and
   - wherein the training set generator is configured to periodically replace the training set with a modified training set, including re-crawling the top-level sites and re-applying the site-specific extraction template to the crawl data associated with the corresponding top-level site, and extracting new instances of the categories from the crawl data and labeling the new instances using the categories within the modified training set.

2. The system of claim 1, wherein the taxonomy includes a tree structure of the hierarchy of categories.

3. The system of claim 1, wherein the crawler includes a site finder configured to receive the plurality of top-level sites from a user by way of a graphical user interface (GUI).

4. The system of claim 1, wherein the crawler includes a site finder configured to execute a search for top level sites to obtain potential top-level sites and to receive a selection from a user of the plurality of the top-level sites from the potential top-level sites.

5. The system of claim 1, wherein the crawler includes a site crawler configured to execute the crawling of the top-level sites including following at least one link from each top-level site through following linked sites until a criteria is met.

6. The system of claim 1, wherein the extractor includes at least one site-specific template generator configured to input a particular top-level site and to receive a correlation of the at least one portion thereof with the at least one category, to thereby generate the corresponding site-specific extraction template.

7. The system of claim 6, wherein the correlation is identified based on a structure of the particular top-level site.

8. The system of claim 1, comprising a trainer configured to receive the training set and determine a classifier model based thereon.

9. The system of claim 8, comprising a classifier associated with supplemental information and configured to receive a new document and to apply the classifier model thereto to obtain a classification thereof.

10. The system of claim 9, wherein the classifier is configured to select supplemental content from the supplemental information, based on the classification, and further configured to supplement the new document with the supplemental content to obtain a supplemented new document.

11. A computer system including instructions stored on a computer-readable medium, the computer system comprising:
    - a training set generator configured to input a taxonomy including a hierarchy of categories and a plurality of top-level sites, and to output a training set of categorized data, the training set generator including:
    - a crawler configured to crawl each of the top-level sites to determine at least one lower-level site associated therewith and to store the top-level sites and associated lower-level sites as crawl data;
    - an extractor configured to determine, for each of the top-level sites, a corresponding site-specific extraction template associating at least one portion of the corresponding top-level site with at least one category of the hierarchy of categories, and further configured to apply each site-specific extraction template to corresponding crawl data to thereby associate the crawl data with the categories of the hierarchical categories and obtain categorized data of the training set,
    - wherein the training set generator is configured to determine a new category of the hierarchy of categories, based on the crawl data, and configured to augment the taxonomy by adding the new category thereto.

12. A computer-implemented method comprising:
    - determining a taxonomy including a hierarchy of categories;
    - determining a plurality of top-level sites related to the taxonomy;
    - determining, for each of the top-level sites, a corresponding site-specific extraction template associating at least one portion of the corresponding top-level site with at least one category of the hierarchy of categories;
    - crawling each of the top-level sites to determine at least one lower-level site associated therewith;
    - storing the top-level sites and associated lower-level sites as crawl data;
    - applying each site-specific extraction template to corresponding crawl data to thereby associate the crawl data with the categories of the hierarchical categories and obtain categorized data, including applying the site-specific extraction template to the crawl data associated with the corresponding top-level site, and further including extracting instances of the categories from the crawl data and labeling the extracted instances using the categories within the training set, and
    - replacing, periodically, the training set with a modified training set, including re-crawling the top-level sites and re-applying the site-specific extraction template to the crawl data associated with the corresponding top-level site, and further including extracting new instances of the categories from the crawl data and labeling the new instances using the categories within the modified training set.

13. The method of claim 12, wherein determining a plurality of top-level sites comprises receiving the plurality of top-level sites from a user.

14. The method of claim 12, wherein determining a plurality of top-level sites comprises:
    executing a search for top level sites to obtain potential top-level sites; and
    receiving a selection from a user of the plurality of the top-level sites from the potential top-level sites.

15. The method of claim 12 wherein applying each site-specific extraction template comprises:
    applying the site-specific extraction template to the crawl data associated with the corresponding top-level site, including extracting instances of the categories from the crawl data and labeling the extracted instances using the categories within the training set.

16. A computer program product, the computer program product being tangibly embodied on a computer-readable medium and including executable code that, when executed, is configured to cause a data processing apparatus to:
    determine a taxonomy including a hierarchy of categories;
    determine a plurality of top-level sites related to the taxonomy;
    determine, for each of the top-level sites, a corresponding site-specific extraction template associating at least one portion of the corresponding top-level site with at least one category of the hierarchy of categories;
    crawl each of the top-level sites to determine at least one lower-level site associated therewith;
    store the top-level sites and associated lower-level sites as crawl data; and
    apply each site-specific extraction template to corresponding crawl data to thereby associate the crawl data with the categories of the hierarchical categories and obtain categorized data, including applying the site-specific extraction template to the crawl data associated with the corresponding top-level site, and further including extracting instances of the categories from the crawl data and labeling the extracted instances using the categories within the training set, and
    replace, periodically, the training set with a modified training set, including re-crawling the top-level sites and re-applying the site-specific extraction template to the crawl data associated with the corresponding top-level site, and further including extracting new instances of the categories from the crawl data and labeling the new instances using the categories within the modified training set.

17. The computer program product of claim 16, wherein the plurality of top-level sites are received from a user.

18. The computer program product of claim 16, wherein the instructions, when executed, cause the data processing apparatus to:
    receive the training set and determine a classifier model based thereon;
    receive a new document and to apply the classifier model thereto to obtain a classification thereon;
    select supplemental content, based on the classification; and
    supplement the new document with the supplemental content to obtain a supplemented new document.

* * * * *